(12) United States Patent
Yu et al.

(10) Patent No.: US 10,982,138 B2
(45) Date of Patent: Apr. 20, 2021

(54) FLUORESCENT NANOCOMPOSITE

(71) Applicant: Agency for Science, Technology and Research, Singapore (SG)

(72) Inventors: Yong Yu, Singapore (SG); Yen Nee Tan, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 397 days.

(21) Appl. No.: 15/836,784

(22) Filed: Dec. 8, 2017

(65) Prior Publication Data

US 2019/0177613 A1    Jun. 13, 2019

(51) Int. Cl.
*C09K 11/58* (2006.01)
*C09K 11/06* (2006.01)

(52) U.S. Cl.
CPC ............. *C09K 11/58* (2013.01); *C09K 11/06* (2013.01); *C09K 2211/1018* (2013.01)

(58) Field of Classification Search
CPC ................................ C09K 11/58; C09K 11/06
See application file for complete search history.

(56) References Cited

U.S. PATENT DOCUMENTS 7,611,907 B2 * 11/2009 Dickson ................ B82Y 15/00
                                                                436/525
2011/0165689 A1 * 7/2011 Ying ...................... B82Y 5/00
                                                                436/81

OTHER PUBLICATIONS

Oba et al., "Biosynthesis of firefly luciferin in adult lantern: decarboxylation of L-cysteine is a key step for benzothiazole ring formation in firefly luciferin synthesis" PLoS One, Dec. 31, 2013, vol. 8 Issue 12, e84023.
Crescenzi et al., "The reaction of cysteine with 1,4-Benzoquinone: a revision" Tetrahedron, Aug. 2 1988, vol. 44 Issue 20, pp. 6447-6450.
McCapra et al., "A model for firefly luciferin biosynthesis" Journal of the Chemical Society, Chemical Communications, Issue 2, 1975, pp. 42-43.

* cited by examiner

*Primary Examiner* — C Melissa Koslow
(74) *Attorney, Agent, or Firm* — Womble Bond Dickinson (US) LLP

(57) ABSTRACT

The present invention relates to a method for forming a nanocomposite having a core-shell structure, the method comprising the steps of: forming a core comprising a first fluorophore capable of aggregation induced emission, and depositing a second fluorophore capable of aggregation caused quenching onto the surface of the core to form a shell at least partially surrounding the core. The present invention also relates to a nanocomposite obtained by said method, and a method of altering the fluorescence of said nanocomposite. The nanocomposite may exhibit dual emission colours and opposite aggregation fluorescent behaviours.

15 Claims, 11 Drawing Sheets

FLUORESCENT NANOCOMPOSITE

TECHNICAL FIELD

The present invention relates to a method for forming a nanocomposite having a core-shell structure, the method comprising the steps of: forming a core comprising a first fluorophore capable of aggregation induced emission, and depositing a second fluorophore capable of aggregation caused quenching onto the surface of the core to form a shell at least partially surrounding the core. The present invention also relates to a nanocomposite obtained by said method.

BACKGROUND ART

Fluorophores are useful due to a variety of important applications such as bioimaging, smart sensing, security inks, dye sensitized solar cells, and light-emitting diodes (LED). Conventional fluorophores are either organic-based materials, for example organic dyes, fluorescent proteins, and aggregation induced emission dyes, or inorganic-based materials, for example semiconductor quantum dots and upconversion nanoparticles. However, both organic-based and inorganic-based materials have their own intrinsic limitations. For example, organic-based fluorophores often have poor photostability. Moreover, the fluorescence of more than 90% of free amine group required to form the pletely quenched upon aggregation due to a phenomenon known as aggregation caused quenching (ACQ).

In addition to the above, for some applications, it is desirable to be able to induce a colour change in the fluorophore. The most common process for inducing a colour change between two individual fluorophores is called Förster resonance energy transfer (FRET), whereby the emission of a donor fluorophore is used to excite an acceptor fluorophore. However, the realizations of fluorescence colour change via FRET must meet certain strict requirements. In particular, the distance and energy level between the donor and acceptor fluorophores must be optimal within a very narrow window. This restricts the availability of matching fluorophores for practical applications.

There is therefore a need to provide a nanocomposite and a method for preparing the same that overcomes or at least ameliorates, one or more of the disadvantages described above.

SUMMARY

In an embodiment, there is provided a method for forming a nanocomposite having a core-shell structure, the method comprising the steps of:
  forming a core comprising a first fluorophore capable of aggregation induced emission, and
  depositing a second fluorophore capable of aggregation caused quenching on the surface of the core to form a shell at least partially surrounding the core.

Advantageously, the method may provide a nanocomposite having dual fluorescence properties depending on the aggregation state of the nanocomposite. Advantageously, the core of the nanocomposite may have relatively low fluorescence in dispersed form, while having relatively high fluorescence in aggregated form. In contrast, the shell of the nanocomposite may have relatively high fluorescence in dispersed form, while having relatively low fluorescence in aggregated form. In dispersed form, the nanocomposite may display the fluorescence properties of the shell, as the fluorescence of the shell would be much brighter than that of the core. In aggregated form, the nanocomposite may display the fluorescence properties of the core, as the fluorescence of the shell will be quenched and the fluorescence of the core will be enhanced.

Further advantageously, the first and second fluorophores may emit fluorescence in different colour ranges. As a result, the overall emission colour of the nanocomposite may change upon aggregation, constituting a new fluorescence colour change mechanism different from the conventional Förster resonance energy transfer (FRET) route.

Advantageously, the method may be green and environmentally friendly. More advantageously, the method is simple. The reaction may be performed in aqueous solution, and small biomolecules may be used as precursors. Further advantageously, the method may be performed in ambient conditions, at room temperature and at atmospheric pressure. Further advantageously, since no toxic elements are used in the method, the method may be biocompatible. In addition, the method may be cost-effective. The method may be simple to up-scale.

In an embodiment, the forming step may comprise contacting a metal salt such as gold(III) chloride with a reductant such as 1,4-hydroquinone. In another embodiment, the depositing step may comprise contacting the core with an oxidant such as 1,4-benzoquinone and a biomolecule such as Cys-Gly. In an embodiment, the forming step and depositing step may be performed simultaneously, and may comprise contacting the gold(III) chloride, the 1,4-hydroquinone and the Cys-Gly in a single reaction vessel to form a mixture.

In the single reaction vessel, two reaction steps may advantageously occur simultaneously. The first reaction step may be the formation of the core by reduction of the gold (III) chloride by 1,4-hydroquinone at room temperature to produce gold (0) to form gold nanoclusters which are less than 2 nm in core size. As a by-product, 1,4-hydroquinone may be oxidized to 1,4-benzoquinone in the first reaction step. The gold nanocluster and 1,4-benzoquinone may advantageously serve as the catalyst and the precursor for the second reaction step, respectively. The second reaction step may be the deposition of the shell onto the surface of the core by formation of a luciferin-like dye by reacting 1,4-benzoquinone with Cys-Gly. The second reaction step may be catalysed by the gold nanocluster produced in the first reaction step. Advantageously, the nanocomposite may therefore be synthesized using metal nanoclusters such as gold nanoclusters formed in situ as the catalyst and with biomolecules as reaction precursors.

More advantageously, the nanocomposite may have a variety of potential applications in biosensing and bioimaging, for example but not limited to smart sensing, imaging, and security inks. In particular, due to the good biocompatibility and high brightness (quantum yield of more than about 0.20) of the nanocomposite, it may be useful as a luminescent probe for biological imaging of live cells, particularly as it has high bio-compatibility and uptake efficiency in mammalian cells.

In another aspect, there is provided a method for altering the fluorescence of a nanocomposite having a core-shell structure, the method comprising the steps of:
  changing an aggregation state of the core-shell nanocomposite, wherein the core of the nanocomposite comprises a first fluorophore capable of aggregation induced emission and the shell of the nanocomposite comprises a second fluorophore capable of aggregation caused quenching.

Advantageously, the method may provide a nanocomposite having dual fluorescence properties depending on the aggregation state of the nanocomposite. Advantageously, the core of the nanocomposite may have relatively low fluorescence in dispersed form, while having relatively high fluorescence in aggregated form. In contrast, the shell of the nanocomposite may have relatively high fluorescence in dispersed form, while having relatively low fluorescence in aggregated form. In dispersed form, the nanocomposite may display the fluorescence properties of the shell, as the fluorescence of the shell is much brighter than that of the core. In aggregated form, the nanocomposite may display the fluorescence properties of the core, as the fluorescence of the shell will be quenched and the fluorescence of the core will be enhanced.

Further advantageously, the first and second fluorophores may emit fluorescence in different colour ranges. As a result, the overall emission colour of the nanocomposite may change upon aggregation, constituting a new fluorescence colour change mechanism different from the conventional Förster resonance energy transfer (FRET) route.

Definitions

The following words and terms used herein shall have the meaning indicated:

The terms "fluorophore" and "fluorogen" may be used interchangeably for the purpose of this disclosure, and generally refer to a chemical compound that can re-emit visible light upon excitation by ultraviolet-visible light.

The term "nanocomposite" for the purposes of this disclosure refers to a multiphase or multicomponent solid material wherein one of the phases or components has one, two or three dimensions less than 100 nm, or structures having nano-scale repeat distances between the different phases or components that make up the material.

The term "nanocluster" for the purposes of this disclosure refers to a cluster of atoms, typically comprising several to a hundred atoms of single or multiple elements, having a size of less than 2 nm. Nanoclusters may have very different physical properties as compared to nanoparticles having a size of greater than 2 nm, even though they differ in size by only a few nanometers.

The term "aggregation-induced emission" or "AIE", which may be interchangeably used for the purpose of this disclosure refers to a phenomenon whereby the photoluminescence efficiency or the quantum yield of a fluorophore is higher when the fluorophores are aggregated or in solid phase or powder form compared to when the fluorophores are in solution phase.

The term "aggregation-caused quenching" or "ACQ", which may be interchangeably used for the purpose of this disclosure, refers to a phenomenon whereby the photoluminescence efficiency or the quantum yield of a fluorophore is lower when the fluorophores are aggregated or in solid phase or powder form compared to when the fluorophores are in solution phase.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

Disclosed herein is a novel design of an organic-inorganic hybrid nanocomposite adopting a core-shell structure which exhibits dual emission colours and opposite aggregation fluorescent behaviours.

There is provided a method for forming a nanocomposite having a core-shell structure, the method comprising the steps of:
    forming a core comprising a first fluorophore capable of aggregation induced emission, and
    depositing a second fluorophore capable of aggregation caused quenching on the surface of the core to form a shell at least partially surrounding the core.

The term "at least partially" in the context of the shell surrounding the core, typically means that at least 0.1%, at least 0.2%, at least 0.5%, at least 1%, at least 2%, at least 5%, at least 10%, at least 20%, at least 50%, at 75%, at least 80%, at least 90% or at least 95% of the core surface area is surrounded by the shell.

The shell does not have to cover the core completely, as long as the core is stabilized by the shell against aggregation.

The first fluorophore may be a nanocluster comprising a metal.

The metal may be selected from an element in Group 10 or Group 11 of the Periodic Table of Elements. The metal may be selected from the group consisting of gold, silver, platinum, copper and any mixture thereof. The metal may be gold.

The nanocluster may have a diameter of less than about 2 nm.

The first fluorophore may be a gold nanocluster.

The metal nanoclusters may show weak to moderate fluorescence as compared to their larger counterparts such as gold, silver, copper, or platinum nanoparticles having a diameter greater than 2 nm, and may therefore not quench the fluorescence of common organic dyes. The fluorescence of the metal nanoclusters is due to aggregation induced emission (AIE), whereby the fluorescence may be enhanced upon aggregation or in dried form.

Ultrasmall gold nanoparticles with core size below 2 nm, generally termed as gold nanoclusters (AuNCs), may be useful in metal nanocatalysis. Such a AuNC catalyst may consist of a few to dozens of Au atoms in the core, and may be protected by a ligand shell to constrain its agglomeration. They have been demonstrated in several important oxidation and hydrogenation reactions. Biomolecules with reducing-cum-protecting properties may serve as two-in-one ligands to direct the synthesis of AuNCs in one-pot solution to reduce gold ions ($Au^{3+}$) and stabilize the as-synthesized AuNCs.

The shell of the nanocomposite may be composed of a second fluorophore which undergoes aggregation caused quenching (ACQ), whereby the fluorescence may be quenched upon aggregation or in dried form. The second fluorophore may be an organic fluorophore.

The organic fluorophore may comprise a benzothiazine moiety. The benzothiazine moiety may have the following structure:

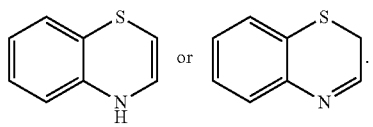

The second fluorophore may have a similar structure to luciferin.

Luciferase-catalysed transformation of luciferin to oxyluciferin in the presence of $Mg^{2+}$, adenosine triphosphate (ATP), and $O_2$ results in the "light-up" mechanism of fireflies. It was found that luciferin in fireflies has a benzothiazol structure which is linked with a thiazoline ring that can be derived from bio-occurring cysteine (Cys). It has been speculated that the reaction of benzoquinone with Cys is involved in the biosynthesis of luciferin. The first fluorophore and second fluorophore may emit fluorescence at different wavelengths. The first fluorophore and second fluorophore may emit fluorescence in different colour regions.

The $\lambda_{em}$ of the colour regions may be about 380 nm to 450 nm for violet emission, about 450 nm to about 495 nm for blue emission, about 495 nm to about 570 nm for green emission, about 570 nm to about 590 nm for yellow emission, about 590 nm to about 620 nm for orange emission, and about 620 nm to about 750 nm for red emission.

Any two of the above colour regions may be selected as the colours region for the first fluorophore and the second fluorophore.

The first fluorophore may have fluorescence emission in the red region. The first fluorophore may emit fluorescence at about 720 nm.

The second fluorophore may have fluorescence emission in the green region. The second fluorophore may emit fluorescence at about 520 nm.

The nanocomposite may exhibit photoluminescent properties in response to its aggregation state. The luciferin-like dye in the shell may show intense green emission ($\lambda_{em}$=520 nm, Quantum Yield (QY)=0.20) in solution which may be completely quenched upon aggregation. In contrast, the gold nanocluster in the core may display relatively weak red emission ($\lambda_{em}$=720 nm) which may be greatly enhanced upon aggregation.

When the nanocomposite is in the aggregated state, for instance in dried form, the fluorescence of the shell will be quenched due to ACQ while the fluorescence of core will be enhanced due to AIE. As a result, the overall emission colour of the nanocomposite may change upon aggregation, constituting a new fluorescence colour change mechanism different from the conventional Förster resonance energy transfer (FRET) route.

The forming step may comprise contacting a metal salt with a reductant.

The metal salt may be a salt of an element in Group 10 or Group 11 of the Periodic Table of Elements. The metal salt may have a high oxidation state. The metal salt may be a salt of an element selected from the group consisting of gold, silver, platinum, copper and any mixture thereof. The metal salt may be a gold salt.

The metal salt may be selected from the group consisting of gold (III) bromide, gold (I) chloride, gold (III) chloride, gold(III) hydroxide, gold (I) iodide, hydrogen tetrabromoaurate (III) hydrate, potassium gold (III) chloride, silver bromate, silver carbonate, silver chlorate, silver chloride, silver chromate, silver citrate hydrate, silver cyanate, silver (I) fluoride, silver iodide, silver lactate, silver nitrate, silver nitrite, silver perchlorate, silver sulfate, cis-diamminetetrachloroplatinum (IV), trans-diamminetetrachloroplatinum (IV), hydrogen hexabromoplatinate (IV), platinum (II) bromide, platinum (II) chloride, platinum (II) cyanide, trans-platinum (II) diammine dichloride, platinum (II) iodide, tetraamimineplatinum (II) hydrogencarbonate, copper (I) bromide, copper (I) chloride, copper (II) chloride, copper (II) fluoride, copper (I) iodide, copper (II) nitrate, copper (II) sulfate and copper (II) tartrate.

The metal salt may be gold (III) chloride ($HAuCl_4$).

The reductant may be any compound that may donate an electron to the metal salt. The reductant may be selected from the group consisting of sodium borohydride, hydrazine, carbon monoxide, protein, peptide, 1,4-hydroquinone and any mixture thereof. The reductant may be a protein selected from the group consisting of serum albumin, bovine serum albumin and human serum albumin, which may be used to synthesize gold nanoclusters at high solution pH in the range of 11 to 12. The reductant may be a peptide such as the tripeptide Glu-Cys-Gly or glutathione, which may be used to synthesize gold nanoclusters with a suitable peptide-to-gold ratio such as 1.5:1 at elevated temperatures such as 75° C. The reductant may be 1,4-hydroquinone. The 1,4-hydroquinone may be oxidized to 1,4-benzoquinone during the forming step.

The method may comprise a capping agent to prevent the formed nanoclusters from aggregating into larger particles. The capping agent may be 1,4-benzoquinone.

The depositing step may comprise contacting the core with an oxidant and a biomolecule, wherein the biomolecule may be an amino acid or a peptide.

The amino acid may be selected from the group consisting of Ala, Arg, Asn, Asp, Cys, Gln, Glu, Gly, His, Ile, Leu, Lys, Met, Phe, Pro, Ser, Thr, Trp, Tyr and Val. The amino acid may be Cys.

The peptide may be a polypeptide. The peptide may be a dipeptide, tripeptide, tetrapeptide or a pentapeptide. The peptide may be any peptide comprising Cys.

The peptide may be a tripeptide such as Glu-Cys-Gly or glutathione.

The peptide may be a dipeptide. The dipeptide may be selected from the group consisting of Ala-Ala, Ala-Arg, Ala-Asn, Ala-Asp, Ala-Cys, Ala-Gln, Ala-Glu, Ala-Gly, Ala-His, Ala-Ile, Ala-Leu, Ala-Lys, Ala-Met, Ala-Phe, Ala- Pro, Ala-Ser, Ala-Thr, Ala-Trp, Ala-Tyr, Ala-Val, Arg-Ala, Arg-Arg, Arg-Asn, Arg-Asp, Arg-Cys, Arg-Gln, Arg-Glu, Arg-Gly, Arg-His, Arg-Ile, Arg-Leu, Arg-Lys, Arg-Met, Arg-Phe, Arg Pro, Arg-Ser, Arg-Thr, Arg-Trp, Arg-Tyr, Arg-Val, Asn-Ala, Asn-Arg, Asn-Asn, Asn-Asp, Asn-Cys, Asn-Gln, Asn-Glu, Asn-Gly, Asn-His, Asn-Ile, Asn-Leu, Asn-Lys, Asn-Met, Asn-Phe, Asn-Pro, Asn-Ser, Asn-Thr, Asn-Trp, Asn-Tyr, Asn-Val, Asp-Ala, Asp-Arg, Asp-Asn, Asp-Asp, Asp-Cys, Asp-Gln, Asp-Glu, Asp-Gly, Asp-His, Asp-Ile, Asp-Leu, Asp-Lys, Asp-Met, Asp-Phe, Asp-Pro, Asp-Ser, Asp-Thr, Asp-Trp, Asp-Tyr, Asp-Val, Cys-Ala, Cys-Arg, Cys-Asn, Cys-Asp, Cys-Cys, Cys-Gln, Cys-Glu, Cys-Gly, Cys-His, Cys-Ile, Cys-Leu, Cys-Lys, Cys-Met, Cys-Phe, Cys-Pro, Cys-Ser, Cys-Thr, Cys-Trp, Cys-Tyr, Cys-Val, Gln-Ala, Gln-Arg, Gln-Asn, Gln-Asp, Gln-Cys, Gln-Gln, Gln-Glu, Gln-Gly, Gln-His, Gln-Ile, Gln-Leu, Gln-Lys, Gln-Met, Gln-Phe, Gln-Pro, Gln-Ser, Gln-Thr, Gln-Trp, Gln-Tyr, Gln-Val, Glu-Ala, Glu-Arg, Glu-Asn, Glu-Asp, Glu-Cys, Glu-Gln, Glu-Glu, Glu-Gly, Glu-His, Glu-Ile, Glu-Leu, Glu-Lys, Glu-Met, Glu-Phe, Glu-Pro, Glu-Ser, Glu-Thr, Glu-Trp, Glu-Tyr, Glu-Val, Gly-Ala, Gly-Arg, Gly-Asn, Gly-Asp, Gly-Cys, Gly-Gln, Gly-Glu, Gly-Gly, Gly-His, Gly-Ile, Gly-Leu, Gly-Lys, Gly-Met, Gly-Phe, Gly-Pro, Gly-Ser, Gly-Thr, Gly-Trp, Gly-Tyr, Gly-Val, His-Ala, His-Arg, His-Asn, His-Asp, His-Cys, His-Gln, His-Glu, His-Gly, His-His, His-Ile, His-Leu, His-Lys, His-Met, His-Phe, His-Pro, His-Ser, His-Thr, His-Trp, His-Tyr, His-Val, Ile-Ala, Ile-Arg, Ile-Asn, Ile-Asp, Ile-Cys, Ile-Gln, Ile-Glu, Ile-Gly, Ile-His, Ile-Ile, Ile-Leu, Ile-Lys, Ile-Met, Ile-Phe, Ile-Pro, Ile-Ser, Ile-Thr, Ile-Trp, Ile-Tyr, Ile-Val, Leu-Ala, Leu-Arg, Leu-Asn, Leu-Asp, Leu-Cys, Leu-Gln, Leu-Glu, Leu-Gly, Leu-His, Leu-Ile, Leu-Leu, Leu-Lys, Leu-Met, Leu-Phe, Leu-Pro, Leu-Ser, Leu-Thr, Leu-Trp, Leu-Tyr, Leu-Val, Lys-Ala, Lys-Arg, Lys-Asn, Lys-Asp, Lys-Cys, Lys-Gln, Lys-Glu, Lys-Gly, Lys-His, Lys-Ile, Lys-Leu, Lys-Lys, Lys-Met, Lys-Phe, Lys-Pro, Lys-Ser, Lys-Thr, Lys-Trp, Lys-Tyr, Lys-Val, Met-Ala, Met-Arg, Met-Asn, Met-Asp, Met-Cys, Met-Gln, Met-Glu, Met-Gly, Met-His, Met-Ile, Met-Leu, Met-Lys, Met-Met, Met-Phe, Met-Pro, Met-Ser, Met-Thr, Met-Trp, Met-Tyr, Met-Val, Phe-Ala, Phe-Arg, Phe-Asn, Phe-Asp, Phe-Cys, Phe-Gln, Phe-Glu, Phe-Gly, Phe-His, Phe-Ile, Phe-Leu, Phe-Lys, Phe-Met, Phe-Phe, Phe-Pro, Phe-Ser, Phe-Thr, Phe-Trp, Phe-Tyr, Phe-Val, Pro-Ala, Pro-Arg, Pro-Asn, Pro-Asp, Pro-Cys, Pro-Gln, Pro-Glu, Pro-Gly, Pro-His, Pro-Ile, Pro-Leu, Pro-Lys, Pro-Met, Pro-Phe, Pro-Pro, Pro-Ser, Pro-Thr, Pro-Trp, Pro-Tyr, Pro-Val, Ser-Ala, Ser-Arg, Ser-Asn, Ser-Asp, Ser-Cys, Ser-Gln, Ser-Glu, Ser-Gly, Ser-His, Ser-Ile, Ser-Leu, Ser-Lys, Ser-Met, Ser-Phe, Ser-Pro, Ser-Ser, Ser-Thr, Ser-Trp, Ser-Tyr, Ser-Val, Thr-Ala, Thr-Arg, Thr-Asn, Thr-Asp, Thr-Cys, Thr-Gln, Thr-Glu, Thr-Gly, Thr-His, Thr-Ile, Thr-Leu, Thr-Lys, Thr-Met, Thr-Phe, Thr-Pro, Thr-Ser, Thr-Thr, Thr-Trp, Thr-Tyr, Thr-Val, Trp-Ala, Trp-Arg, Trp-Asn, Trp-Asp, Trp-Cys, Trp-Gln, Trp-Glu, Trp-Gly, Trp-His, Trp-Ile, Trp-Leu, Trp-Lys, Trp-Met, Trp-Phe, Trp-Pro, Trp-Ser, Trp-Thr, Trp-Trp, Trp-Tyr, Trp-Val, Tyr-Ala, Tyr-Arg, Tyr-Asn, Tyr-Asp, Tyr-Cys, Tyr-Gln, Tyr-Glu, Tyr-Gly, Tyr-His, Tyr-Ile, Tyr-Leu, Tyr-Lys, Tyr-Met, Tyr-Phe, Tyr-Pro, Tyr-Ser, Tyr-Thr, Tyr-Trp, Tyr-Tyr, Tyr-Val, Val-Ala, Val-Arg, Val-Asn, Val-Asp, Val-Cys, Val-Gln, Val-Glu, Val-Gly, Val-His, Val-Ile, Val-Leu, Val-Lys, Val-Met, Val-Phe, Val-Pro, Val-Ser, Val-Thr, Val-Trp, Val-Tyr and Val-Val.

The dipeptide may be selected from the group consisting of Ala-Cys, Arg-Cys, Asn-Cys, Asp-Cys, Cys-Ala, Cys-Arg, Cys-Asn, Cys-Asp, Cys-Cys, Cys-Gln, Cys-Glu, Cys-Gly, Cys-His, Cys-Ile, Cys-Leu, Cys-Lys, Cys-Met, Cys-Phe, Cys-Pro, Cys-Ser, Cys-Thr, Cys-Trp, Cys-Tyr, Cys-Val, Gln-Cys, Glu-Cys, Gly-Cys, His-Cys, Ile-Cys, Leu-Cys, Lys-Cys, Met-Cys, Phe-Cys, Pro-Cys, Ser-Cys, Thr-Cys, Trp-Cys, Tyr-Cys, and Val-Cys.

The biomolecule may comprise a thiol group. The thiol group may be represented as —S—H. The biomolecule may comprise a primary amine group. The primary amine group may be represented as —NH$_2$. The biomolecule may comprise both a thiol group and a primary amine group.

The biomolecule may be sterically hindered at the β-carbonyl end. The steric hindrance at the β-carbonyl end may be provided by the presence of a capping group other than hydrogen, or another amino acid or a peptide, in the case of a polypeptide. The steric hindrance may be provided by a Gly residue.

The amino acid may be Cys. The peptide may be Cys-Gly.

The biomolecule may be a cysteine-containing molecule wherein 1) amine group at the α-site is a primary amine group, and 2) the β-carbonyl end has adequate steric hindrance. The adequate steric hindrance may be in the form of another amino acid attached to the cysteine, such as a glycine.

The oxidant may be selected from a group of 1,4-benzoquinone derivatives, selected from the group consisting of 1,4-benzoquinone, 2-methyl-1,4-benzoquinone, and phenyl-1,4-benzoquinone. The oxidant may be 1,4-benzoquinone. The 1,4-benzoquinone may be the oxidized product of 1,4-hydroquinone formed during the forming step.

The forming step and depositing step may be performed simultaneously or sequentially.

The forming step and depositing step may be performed simultaneously, and may comprise contacting the metal, the reductant and the biomolecule in a single reaction vessel to form a mixture.

The forming step and/or the depositing step may be performed in aqueous solution. The metal, the reductant and/or the biomolecule may be provided as an aqueous solution.

The concentration ratio of metal:reductant may be in the range of about 2:3 to about 3:2, or about 1:1, and the concentration ratio of reductant:biomolecule may be about 1:4 to about 1:2, or about 1:3.

The metal, reductant and biomolecule may be contacted at a concentration in the range of about 0.5 mM to about 5 mM, about 0.5 mM to about 5 mM and about 2 mM to about 15 mM, respectively.

The method may further comprise a step of adding a base.

The base may be sodium hydroxide.

The base may be added to adjust the pH of the mixture to be in the range of about 11 to about 12, about 11 to about 11.5 or about 11.5 to about 12.

The forming step and/or the depositing step may be performed at room temperature. The forming step and/or the depositing step may be performed at atmospheric pressure.

The forming step and/or the depositing step may be performed for a duration in the range of about 18 hours to about 30 hours, or about 24 hours.

The method may facilitate the synthesis of the nanocomposite at ambient temperature, and by mimicking the mild yet efficient biological conditions of luciferin synthesis in nature.

The method may further comprise the step of purifying the nanocomposite by dialysis.

The dialysis may be performed at a molecular weight cut-off (MWCO) in the range of about 4 kDa to about 8 kDa, about 4 kDa to about 5 kDa, about 4 kDa to about 6 kDa, about 5 kDa to about 7 kDa, about 5 kDa to about 6 kDa, about 5 kDa to about 7 kDa, about 5 kDa to about 8 kDa, about 6 kDa to about 7 kDa about 6 kDa to about 8 kDa, about 7 kDa to about 8 kDa, or about 4 kDa, about 5 kDa, about 6 kDa, about 7 kDa or about 8 kDa.

The forming step and depositing step may be performed simultaneously, and in one embodiment, may comprise contacting the gold salt, 1,4-hydroquinone and Cys-Gly in a single reaction vessel to form a mixture.

In the single reaction vessel, two reaction steps may occur simultaneously. The first reaction step may be the formation of the core by reduction of the gold by 1,4-hydroquinone at room temperature for 24 hours under alkaline condition (pH ~11-12) to form gold nanoclusters of approximately 1.82±0.02 nm in size. As a by-product, 1,4-hydroquinone is oxidized to 1,4-benzoquinone in the first reaction step. The gold nanocluster and 1,4-benzoquinone may serve as the catalyst and the precursor for the second reaction step, respectively. The second reaction step may be the deposition of the shell onto the surface of the core by formation of a luciferin-like dye by reacting 1,4-benzoquinone with a biomolecule such as the dipeptide Cys-Gly. The second reaction step may be catalysed by the gold nanocluster produced in the first reaction step. The two reactions may occur simultaneously, thus forming a gold nanocluster core (inorganic)-shell (organic) hybrid nanocomposite gold nanocluster core dye-shell hybrid structure. The nanocomposite may therefore be synthesized using metal nanoclusters such as gold nanoclusters formed in situ as the catalyst and with biomolecules as reaction precursors.

There is also provided a nanocomposite obtained by the method as described above.

There is also provided a method for altering the fluorescence of a nanocomposite having a core-shell structure, the method comprising the steps of:
  changing an aggregation state of the core-shell nanocomposite, wherein the core of the nanocomposite comprises a first fluorophore capable of aggregation induced emission and the shell of the nanocomposite comprises a second fluorophore capable of aggregation caused quenching.

The aggregation state may be defined by the density of the nanocomposite or the distance between each nanocomposite. The density of or the distance between each of the nanocomposite may be changed from aggregated form to dispersed form. The aggregated form may be when the nanocomposite is a solid or is in a highly concentrated form. The aggregated form may be when the nanocomposite is in solid phase or powder form. The dispersed form may be when the nanocomposite is at least partially dissolved in solution.

The aggregation state may be defined by the proportion of the nanocomposite that is dissolved in solution.

The term "at least partially" in the context of being dissolved in solution, typically means that at least 0.000001 w/v %, at least 0.000002 w/v %, at least 0.000005 w/v %, 0.00001 w/v %, at least 0.00002 w/v %, at least 0.00005 w/v %, 0.0001 w/v %, at least 0.0002 w/v %, at least 0.0005 w/v %, at least 0.001 w/v %, at least 0.002 w/v %, at least 0.005 w/v %, 0.01 w/v %, at least 0.02 w/v %, at least 0.05 w/v %, at least 0.1 w/v %, at least 0.2 w/v %, at least 0.5 w/v %, at least 1 w/v %, at least 2 w/v %, at least 5 w/v %, at least 10 w/v %, at least 20 w/v %, at least 50 w/v %, at 75 w/v %, at least 80 w/v %, at least 90 w/v % or at least 95 w/v % of the nanocomposite is dissolved in solution.

The nanocomposite may be in the aggregated form when it is in substantially pure form and substantially free of impurities or solvent.

The nanocomposite may be in the dispersed form when it is at least partially dissolved in a solvent. That is, the nanocomposite may be in the dispersed from when at least part of the nanocomposite is in solution.

The solvent may be any liquid in which the nanocomposite dissolves. The solvent may be an organic solvent or an aqueous solvent. The solvent may be any solvent miscible with water. The solvent may be selected from the group consisting of methanol, ethanol, dimethylsulfoxide, dimethylformamide, water and any mixture thereof. The solvent may be substantially pure water. The density or the distance between each of the nanocomposite may be changed by taking a solid form of the nanocomposite and dissolving it in a solvent to form a solution of the nanocomposite. The density or the distance between each of the nanocomposite may be changed by taking a solution of the nanocomposite and removing the solvent to form a solid form of the nanocomposite. The density or the distance between each of the nanocomposite may be increased or decreased in solution. The density or the distance between each of the nanocomposite in solution may be decreased by adding solvent. The density or the distance between each of the nanocomposite in solution may be increased by removing solvent. The removing of the solvent may be done by evaporation.

Precipitation of the nanocomposite from solution may be an indication of aggregation.

The first fluorophore and second fluorophore may emit fluorescence at different wavelengths. The first fluorophore and second fluorophore may emit fluorescence in different colour regions.

The $\lambda_{em}$ of the colour regions may be about 380 nm to 450 nm for violet emission, about 450 nm to about 495 nm for blue emission, about 495 nm to about 570 nm for green emission, about 570 nm to about 590 nm for yellow emission, about 590 nm to about 620 nm for orange emission, and about 620 nm to about 750 nm for red emission.

Any two of the above colour regions may be selected as the colour regions for the first fluorophore and the second fluorophore.

The first fluorophore may have a fluorescence emission in the red region. The first fluorophore may emit fluorescence at about 720 nm.

The second fluorophore may have a fluorescence emission in the green region. The second fluorophore may emit fluorescence at about 520 nm.

The nanocomposite may substantially exhibit the fluorescence properties of the first fluorophore when the nanoparticle is aggregated. The nanoparticle may substantially exhibit the fluorescence properties of the second fluorophore when the nanoparticles is dispersed.

The nanocomposite may substantially exhibit the fluorescence properties of the first fluorophore when the nanoparticle is dispersed. The nanoparticle may substantially exhibit the fluorescence properties of the second fluorophore when the nanoparticles is aggregated.

There is also provided a method for altering the fluorescence of a nanocomposite having a core-shell structure, the method comprising the steps of:
  changing an aggregation state of the core-shell nanocomposite, wherein the core of the nanocomposite comprises a first fluorophore capable of aggregation induced emission and the shell of the nanocomposite comprises a second fluorophore capable of aggregation caused quenching,
  such that when the nanocomposite is aggregated, the nanocomposite exhibits the fluorescence of the first fluorophore and when the nanocomposite is not aggregated, the nanocomposite exhibits the fluorescence of the second fluorophore.

The nanocomposite may exhibit photoluminescent properties in response to its aggregation state. The luciferin-like dye in the shell may show intense green emission ($\lambda_{em}$=520 nm, Quantum Yield (QY)=0.20) in solution which may be completely quenched upon aggregation. In contrast, the gold nanocluster in the core may display relatively weak red emission in solution ($\lambda_{em}$=720 nm) which may be greatly enhanced upon aggregation.

When the nanocomposite is in the aggregated state, for instance in dried, solid form, the fluorescence of the shell may be quenched due to ACQ while the fluorescence of the core may be enhanced due to AIE. As a result, the overall emission colour of the nanocomposite may change upon aggregation (and therefore change in density), constituting a new fluorescence colour change mechanism different from the conventional Förster resonance energy transfer (FRET) route.

There is also provided a use of a nanocomposite obtained by the method as described above in biosensing and bioimaging.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 9A is a photoemission spectrum showing that the formation of AuNC accelerates the formation of the dye, FIG. 9B is a UV-vis spectrum of the reaction solution during the synthesis of AuNC@dye after adding individual reagents in sequence, FIG. 9C is a photoemission spectrum of the final AuNC@dye product prepared with different Cys-Gly-to-Au ratios ($R_{[Cys-Gly]/[Au]}$) and FIG. 9D is a photoemission spectrum of the final AuNC@dye product prepared with different HQ-to-Au ratio ($R_{[HQ]/[Au]}$).

FIG. 10A is a scheme showing the structure relationship of each peptide/amino acid tested, FIG. 10B is a photoemission spectrum of the products obtained using different peptides/amino acids with varied peptide/amino acid-to-Au ratios ($R_{[X]/[Au]}$), where X=GSH (1), Glu-Cys (2), and Cys (3), respectively. The photoluminescence spectrum of AuNC@dye synthesized using Cys-Gly (dashed line) is also included for ease of comparison.

FIG. 12A is the fluorescence image, FIG. 12B is the bright-field image and FIG. 12C is the overlay of the fluorescence and bright-field images.

EXAMPLES

Non-limiting examples of the invention will be further described in greater detail by reference to specific Examples, which should not be construed as in any way limiting the scope of the invention.

Example 1: Materials and Methods

Materials

Gold (III) chloride solution (HAuCk$_4$, 30% in dilute HCl), L-glutathione (GSH, 98%), L-cysteinyl-L-glycine (Cys-Gly, 85%), L-γ-glutamyl-L-cysteine (γ-Glu-Cys, 80%), L-cysteine (Cys, 97%), and quinine sulphate (QS, 98%), D-luciferin (99%) were purchased from Sigma-Aldrich. Hydroquinone (HQ, benzene-1,4-diol, 99.5%) was purchased from Acros Organic.

All reagents were used as received and without further purification. All glassware were washed with Aqua Regia (HCl:HNO$_3$ volume ratio=3:1) and rinsed with ethanol and ultrapure water. Ultrapure water with a specific resistance of 18.2 MΩ was used throughout the experiment.

"AuNC@dye" refers to a gold nanocluster coated with a fluorescent dye.

Methods

Physical Characterization

UV-Vis absorption and photoluminescence (PL) spectra were recorded on a Shimadzu UV-2450 spectrometer and an Infinite® M200 plate reader (from Tecan), respectively. Transmission electron microscopy (TEM) images were taken on a JEOL JEM-2010microscope operating at 200 kV. The quantum yield (QY) of AuNC@dye was measured using a 370 nm Xenon laser as light source and quinine sulphate as reference. The QY of AuNC@dye was calculated based on a comparative method and using the equation below.

$$Q_S = Q_R \times \frac{k_S}{k_R} \times \frac{n_S^2}{n_R^2}$$

where QR is the known quantum yield of the reference compound, k is slope of the lines obtained from the plot of the integrated fluorescence intensity ($\lambda_{ex}$=370 nm) vs. absorbance (at 370 nm), n is the refractive index of solvent, and the subscripts S and R refer to sample and reference, respectively.

Cell Culture

HeLa cells were incubated in DMEM medium (High glucose, Invitrogen) with 10% fetal bovine serum and 1% penicillin-streptomycin (37° C., 5% $CO_2$). To investigate cellular uptake of AuNC@dye, the cells were incubated with AuNC@dye (160 µM, Au basis) at 37° C. for 4 hours. Then the cells were washed three times with PBS buffer and the fluorescence images were acquired by confocal laser scanning microscopy (CLSM) (Fluoview 1000, Olympus, Japan) under 405 nm excitation. The metabolic activity of HeLa cells was evaluated using methylthiazolyldiphenyltetrazolium (MTT) assay and the cell viability was expressed by the ratio of absolute absorbance of the cells incubated with increasing AuNC@dye suspensions (25, 50, 100, 150, 200 µM) to that of the cells incubated with culture medium only (i.e. nontreated control).

Example 2: Synthesis of the Hybrid Nanocomposite

Figure 1:
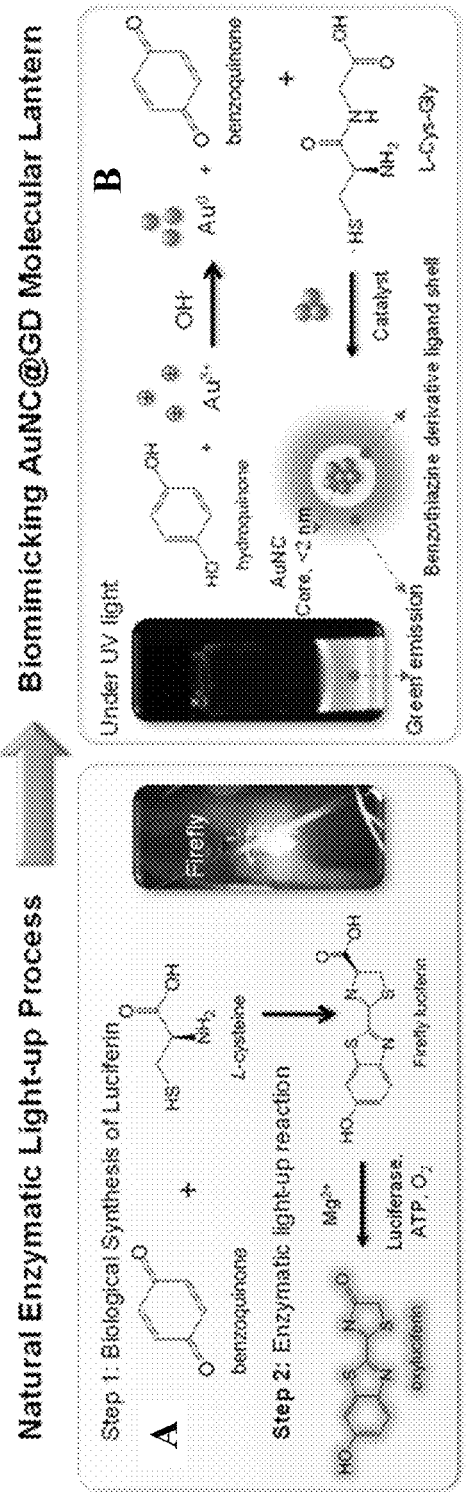
FIG. 1 is a schematic illustration of (A) the mechanism of luciferin fluorescence and (B) a one-step bioinspired synthesis of green emitting molecular lantern via the catalytic reaction between AuNCs and dipeptide precursors according to the present disclosure.

A biotemplating method is used to synthesize the nanocomposite at room temperature using gold chloride ($HAuCl_4$), hydroquinone, and a cysteine-containing peptide (e.g., Cys-Gly). A schematic diagram of the synthesis is shown in FIG. 1.

Aqueous solutions of $HAuCl_4$ (20 mM, 50 µL), Hydroquinone (20 mM, 50 µL) and Cys-Gly (20 mM, 150 µL) were sequentially added into a glass vial containing ultrapure water under constant stirring at 500 rpm. Then aliquots of NaOH (1 M, 20 µL) were added into the mixture to trigger the reaction. The volume of the final reaction mixture was adjusted to 1 mL. An aqueous solution of strong green-emitting AuNC protected by dye molecules (AuNC@dye) was formed and collected after 24 hours of reaction. The AuNC@dye product was dialyzed using a Fisher dialysis tubing with a molecular weight cut-off (MWCO) of 6 kDa for further use.

Example 3: Characterization of the Hybrid Nanocomposite

Size Distribution

Figure 3:
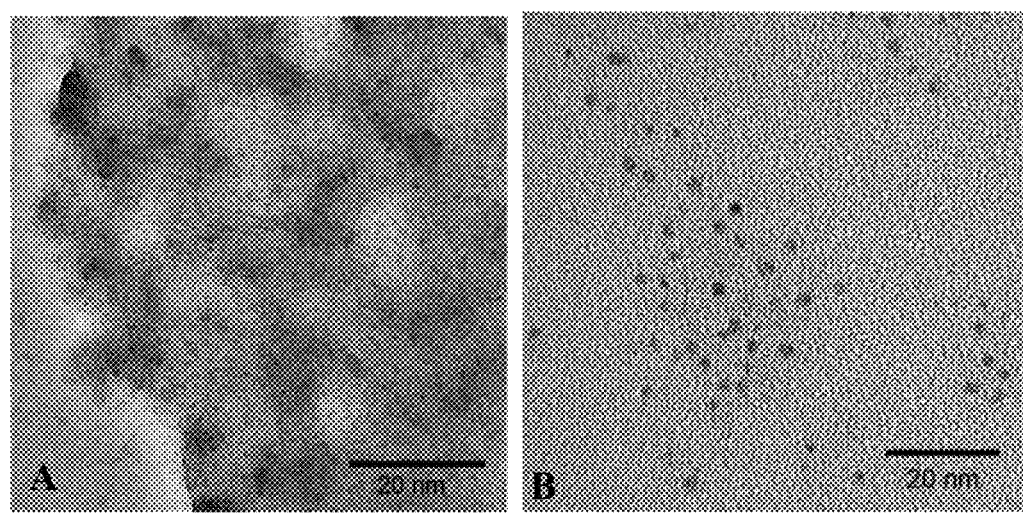
FIG. 3 refers to (A) low and (B) high resolution TEM images of the AuNC@dye.
Figure 4:
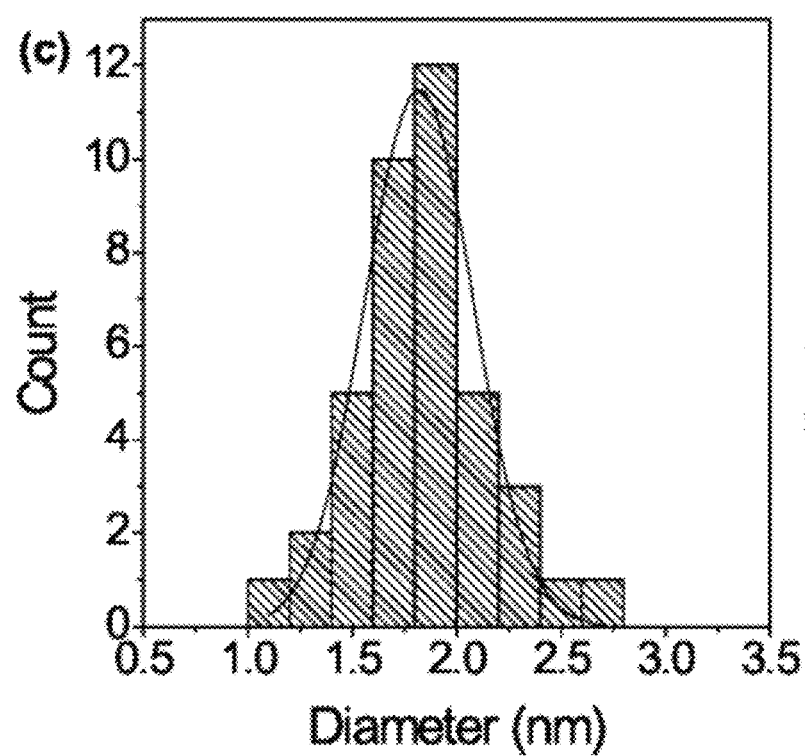
FIG. 4 is a size distribution histogram of AuNC@dye in FIG. 1(B).

Transmission electron microscopy (TEM) was first used to characterize the size of the AuNC@dye. FIG. 3A and FIG. 3B are TEM images of the nanocomposite at different magnifications. A small aliquot of the nanocomposite was dropped on a copper grid and air-dried prior to TEM measurement. As shown in FIG. 3, the synthesized Au particles are very small in size and no large particles were observed. Analysis of the high resolution TEM image (FIG. 3B) gives an average diameter of 1.82±0.02 nm for these Au particles (FIG. 4), which confirms the as-synthesized particles are AuNCs.

UV-Vis and Fluorescence Spectroscopy

Figure 5:
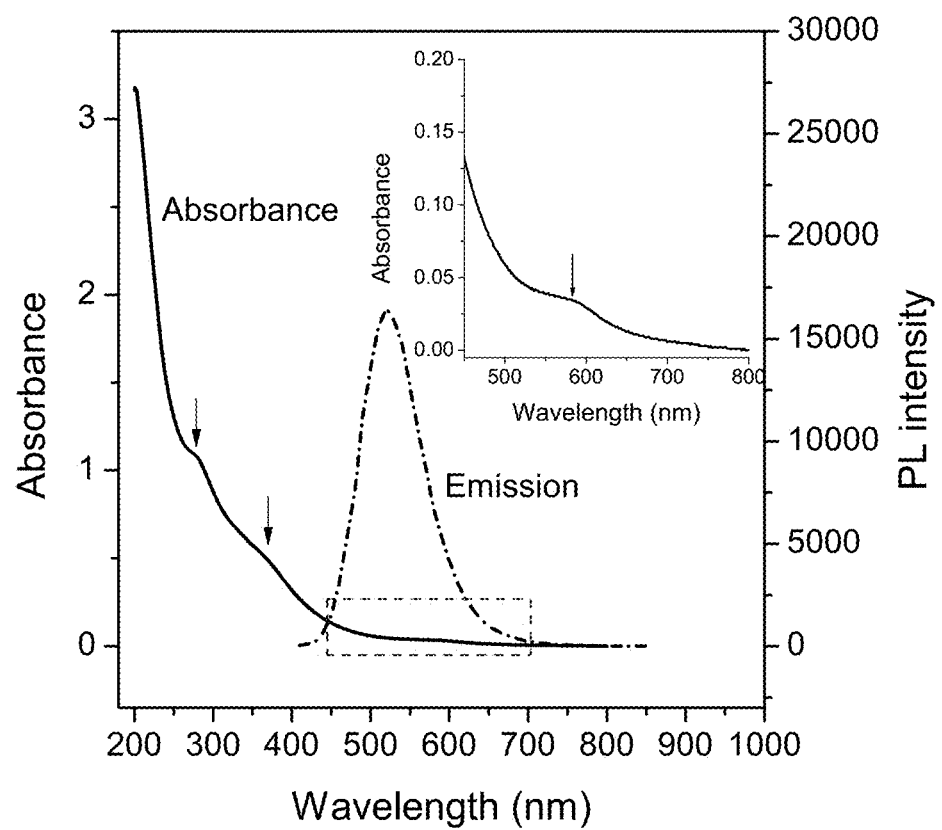
FIG. 5 is a graph showing the UV-vis (solid line) and photoemission (dash dot line) spectra of the AuNC@dye.

The formation of AuNCs was also confirmed by the UV-vis spectrum. It is well documented that Au nanoparticles (AuNPs) with core size larger than 2 nm show a distinct peak near 520 nm on their UV-vis spectra due to surface plasmon resonance (SPR). However, no SPR peaks are observed on the UV-vis spectrum, which rules out the formation of large AuNPs (FIG. 5, solid line). Enlarged UV-vis spectrum shows a shoulder peak at 583 nm (FIG. 5, inset), which can be attributed to the typical molecular-like absorption of AuNCs reported for the sub-2 nm gold nanoparticles. In addition, no precipitation was observed by high speed centrifugation, which rules out the possibility of very large Au particles or anisotropic structures having formed.

Figure 6:
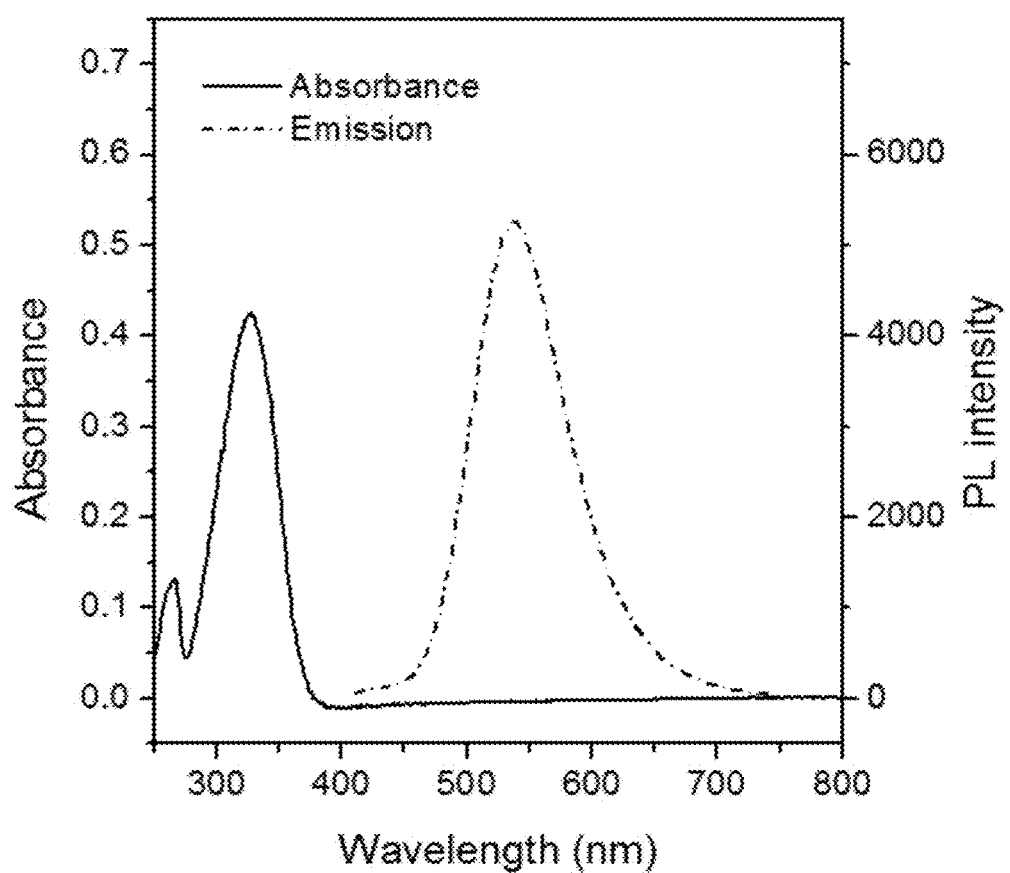
FIG. 6 is a UV-vis (solid line) and photoemission (dash dot line) spectra of luciferin.

The green emitting dye was characterized by its ultraviolet-visible (UV-vis) and photoemission spectra (FIG. 5). The two absorption peaks at 273 nm and 368 nm observed on its UV-vis spectrum was due to its benzothiazolyl moiety. Note that luciferin with a similar benzothiazole moiety also shows two absorption peaks at 267 nm and 327 nm, respectively (FIG. 6). The AuNC@dye exhibits a green emission centered at 520 nm when excited at 365 nm (FIG. 5, dash dot line). The optical properties are similar to that of luciferin, which shows two absorption peaks at 267 nm and 327 nm, and emits at 540 nm (FIG. 6). The quantum yield (QY) of the AuNC@dye was measured and compared to the luciferin using quinine sulphate (QS) as a reference. The QY of the shell of AuNC@dye is 0.20, which is very close to that of luciferin (QY=0.29). However, unlike luciferin in nature, the AuNC@dye contains a metal core comprising gold nanoparticles having a diameter of less than 2 nm (FIG. 1).

Figure 2:
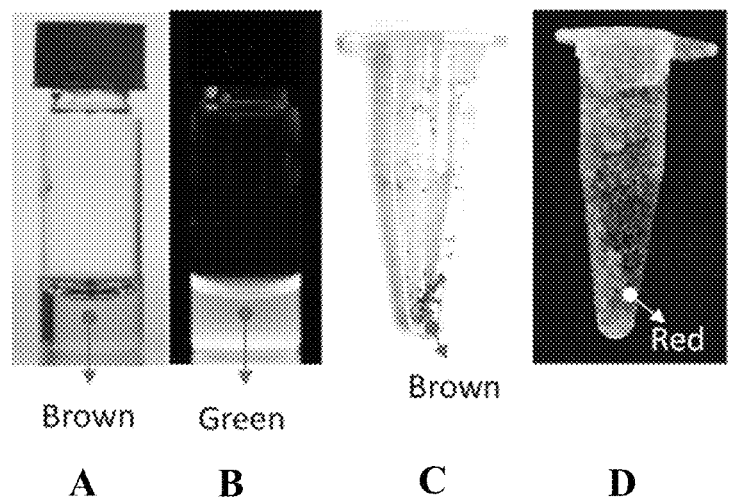
FIG. 2 is a set of photographs of the inventive nanocomposite in (A) solution in day light, (B) solution under UV light, (C) dried/powder form in day light and (D) dried/powder form under UV light.
Figure 7:
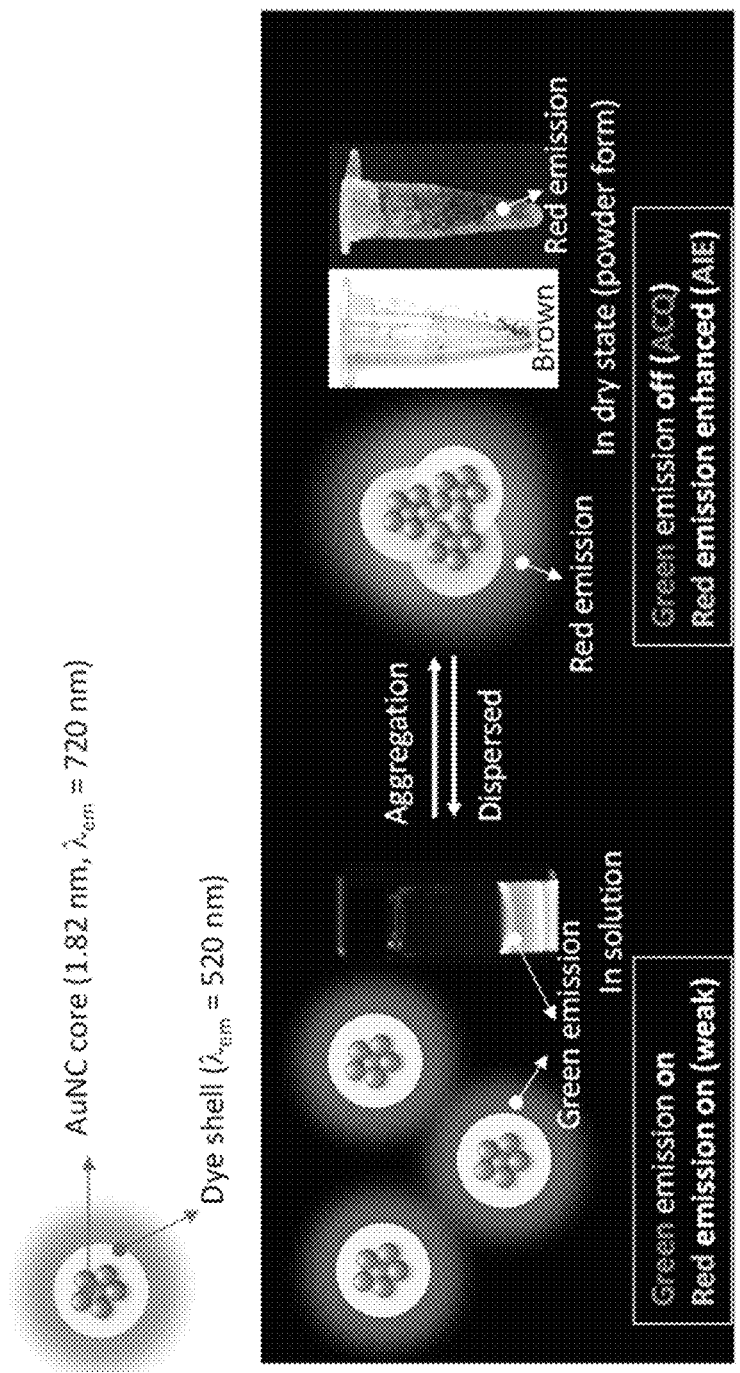
FIG. 7 is a schematic illustration showing how the fluorescence profile of the AuNC@dye changes on aggregation state.

The AuNC core itself shows relatively weak fluorescence ($\lambda_{em}$=720 nm) in solution due to the strong quantum confinement effect of the small (less than 2 nm) diameter of the AuNC core. However, their fluorescence can be enhanced upon aggregation due to AIE. The fluorescence of the shell resembles that of luciferin ($\lambda_{em}$=520 nm) and is quenched upon aggregation due to ACQ. By bringing the metal nanocluster and the shell close together, AuNC@dye only displays the strong emission of the shell in solution, as the fluorescence of the metal core is weak and overpowered by the fluorescence of the shell (FIGS. 2A and 2B). However, when the nanocomposite is in dry form, the fluorescence of the shell is quenched due to ACQ while the metal nanoclusters remain fluorescent due to AIE, giving a different fluorescence emission profile (FIGS. 2C and 2D). This phenomenon is also schematically represented in FIG. 7.

Specifically, FIGS. 2A and 2B are digital photos of the nanocomposite dissolved in water. FIG. 2C and FIG. 2D are digital photos of the nanocomposite in powder form after being freeze-dried. FIG. 2A and FIG. 2C are taken under day light while FIG. 2B and FIG. 2D are taken under UV light.

Figure 8:
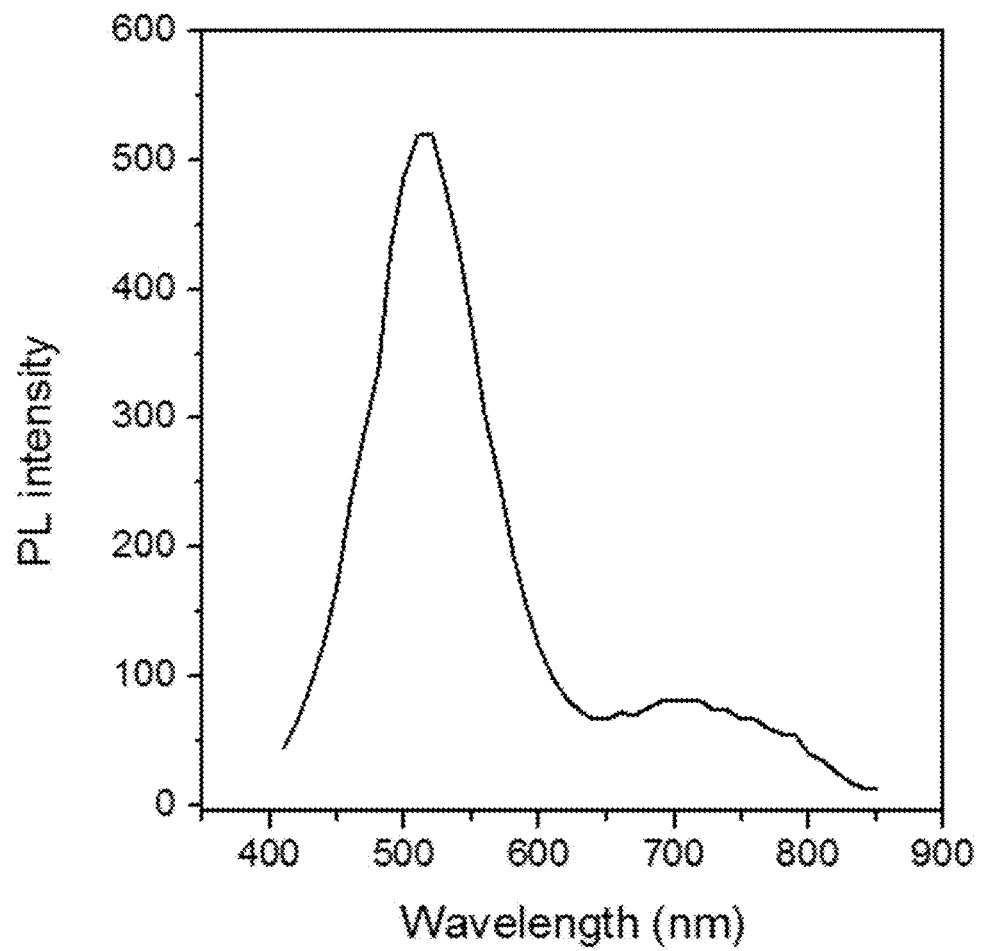
FIG. 8 is photoemission spectrum of the AuNC@dye at the reaction time of 1 h.

FIG. 8 is the emission spectrum of nanocomposite measured at a reaction time of 1 hour when the formation of dye was not fully complete. The emission peak of AuNC was observable at ~720 nm as the intensity of dye was relatively low at this point.

Reaction Conditions

Figure 9A:
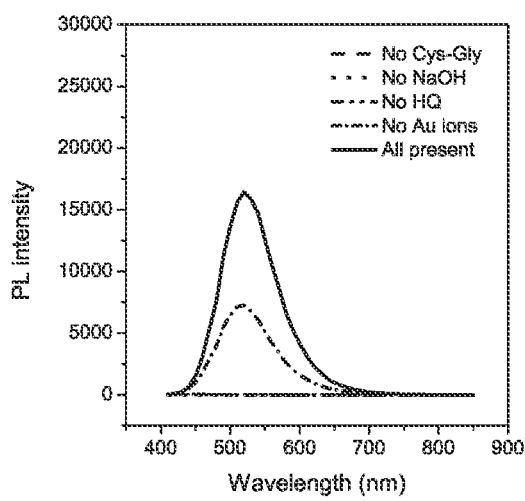
FIGS. 9A-9D refer to a set of graphs showing the role of different chemical reagents in the synthesis of the AuNC@dye and their optimized reaction conditions.

A set of experiments were carried out to support the proposed formation process of AuNC@dye as illustrated in FIG. 1. Firstly, the role of each chemical reagent involved in the synthesis and their optimized conditions to form bright emitting species was investigated. As shown in FIG. 9A, no fluorescent species were formed in the absence of Cys-Gly or hydroquinone, proving that they were the essential materials to produce the dye according to FIG. 1. No fluorescence was observed either if there was no addition of NaOH to trigger the reaction by converting hydroquinone into benzoquinone. Although fluorescent species was able to form in the absence of $Au^+$, its intensity was less than half of that formed in the presence of $Au^{3+}$, which highlighted the catalytic role of ultrasmall AuNCs in the formation of bright fluorescent species. It is speculated that the selective protection of AuNC by the brightly green emitting dye could possibly drive the reaction towards the formation of more dyes. It has been well documented that ligand protected AuNC such as thiolated AuNC show circular dichroism activity derived from its unique atomic arrangement exerted by surface ligands. Hence, these brightly emitting dyes may bind to AuNC much easier due to their preferred chiral arrangement. Furthermore, ligand protected AuNC also showed good selectivity in several catalytic reactions.

Figure 9B:
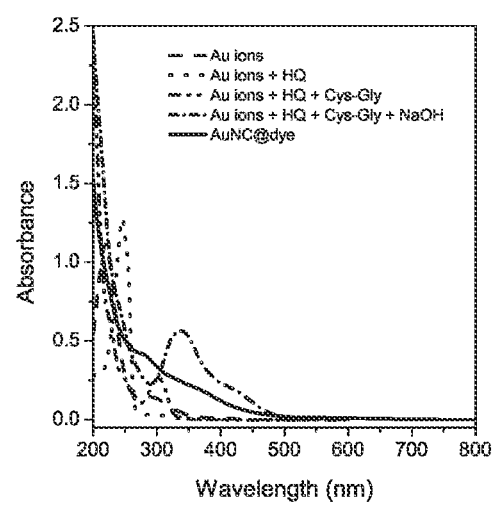

The optical absorption feature of the reaction mixture was also monitored in sequence of adding each reagent to better understand their role in the catalytic reaction (FIG. 9B). When only gold chloride was present in the reaction mixture, two absorption peaks at 218 and 295 nm due to the ligand-to-metal charge transfer were observed on its UV-vis spectrum (- - line). After the addition of hydroquinone, a new peak at 246 nm appeared, which is accompanied by the disappearance of the 218 nm peak and the decrease in intensity of the 295 nm peak. This result suggests that the successful binding of hydroquinone to $Au^{3+}$ and the 246 nm peak is possibly due to the charge transfer from hydroquinone to $Au^{3+}$ (- - - line) (note that hydroquinone itself shows absorption peaks at 222 and 295 nm). When Cys-Gly was added, the 295 nm peak was recovered while the 246 nm peak decreased substantially, indicating that Cys-Gly could also coordinate with the $Au^{3+}$ (- - - line). After introducing NaOH into reaction mixture, two new peaks at 337 and 420 nm appeared on the spectrum, which clearly showed that $Au^{3+}$ was reduced and the fluorescent dye started to form. In addition, the concentrations of Cys-Gly and hydroquinone were optimized to obtain AuNC@dye with the highest fluorescence.

Figure 9C:
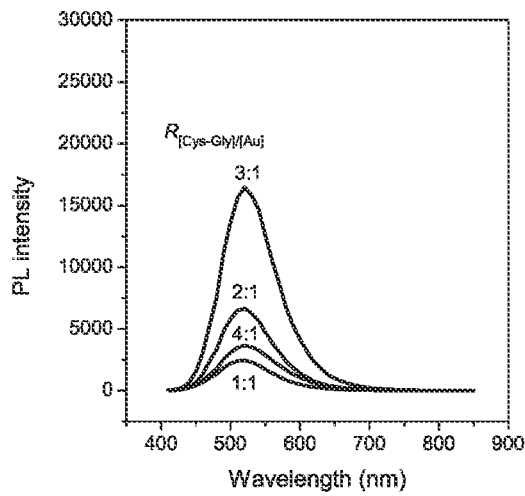
Figure 9D:
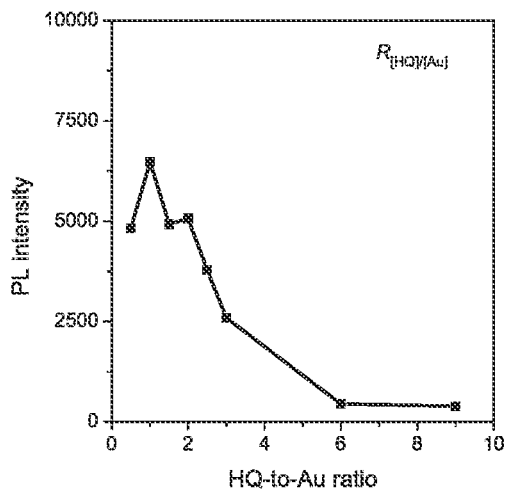

As shown in FIGS. 9C and 9D, the Cys-Gly-to-Au ratio (or $R_{[Cys-Gly]/[Au]}$) and HQ-to-Au ratio ($R_{[HQ]/[Au]}$) do have a profound effect on the fluorescence intensity of the resultant AuNC@dye. When $R_{[Cys-Gly]/[Au]}=3$ and $R_{[HQ]/[Au]}=1$, the resultant AuNC@dye has the highest fluorescence intensity. These results suggest that Cys-Gly need to be in excess in order to better coordinate with $Au^{3+}$ and drive the reaction in forming the desired green fluorescent dye.

Figure 10A:
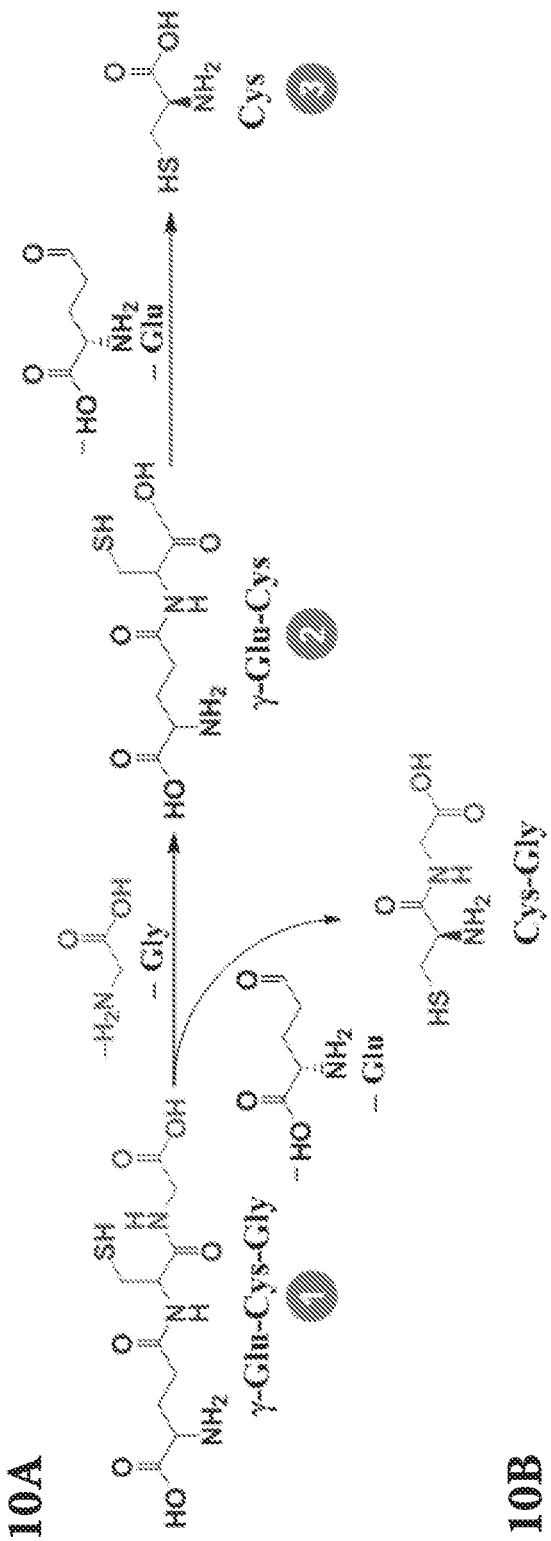
FIGS. 10A-10B refer to a set of diagrams showing the formation of the dye.
Figure 10B:
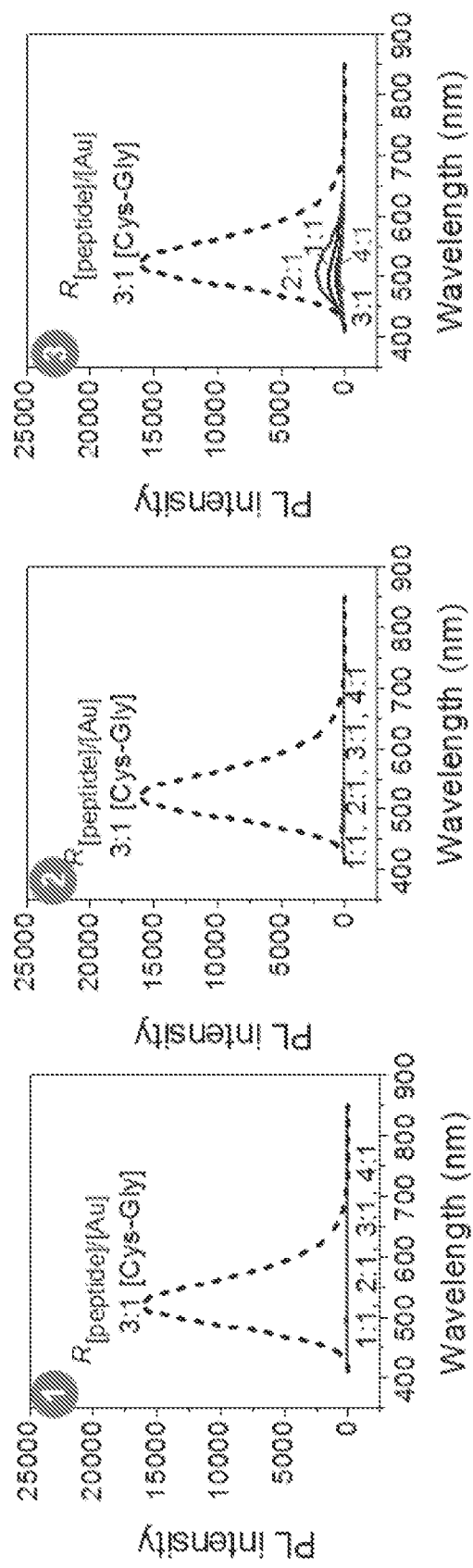

As Cys-Gly is the source material to produce glutathione (GSH) in the biological systems, which can also be obtained from the degradation of GSH, a systematic study was carried to investigate whether other molecules derived from GSH (including GSH) can be utilized to produce the green emitting AuNC@dye. As shown in FIG. 10A, the breakage of GSH (1) at different amide bonds leads to Glu-Cys (2), Cys-Gly and Cys (3). It was found that no fluorescent dyes were formed by replacing Cys-Gly with GSH as the emission spectra of the resultant mixture at different ratios were nearly flat and overlapped with each other (FIG. 10B, left), which might be due to the lack of a free amine group required to form the benzothiazolyl moiety. Similar results were observed for Glu-Cys as Glu-Cys did not possess a free amine group at the vicinity of the thiol group as well (FIG. 10B, middle). By replacing Cys-Gly with Cys, it was found that some green emitting species were actually formed (FIG. 10B, right). However, the intensity of these species was far less than that of those synthesized using Cys-Gly. This finding suggested some steric hindrance at the β-carbonyl end might be essential to improve the yield of the fluorescent species.

Example 4: Application of the Hybrid Nanocomposite in Bioimaging

Figure 11:
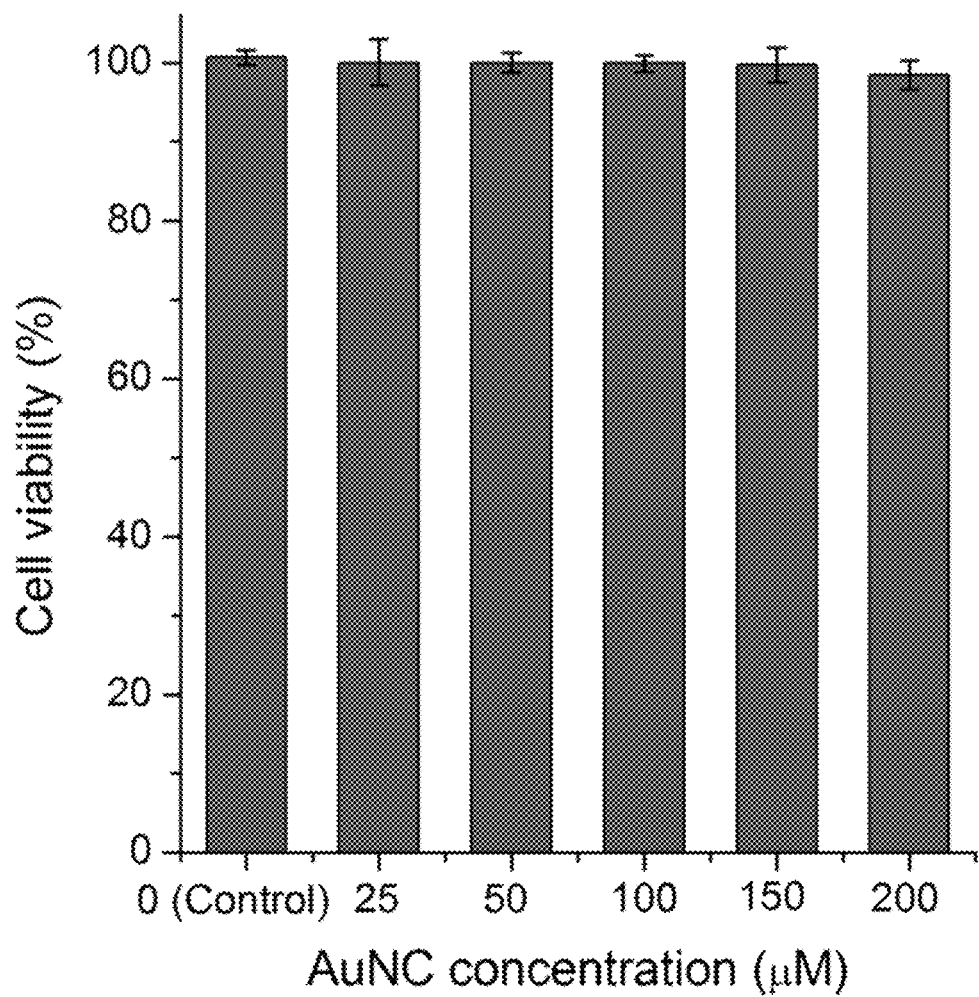
FIG. 11 is a graph showing the in vitro viability of HeLa cells treated with the AuNC@dye at a concentration ranging from 0 to 200 µM (Au basis).
Figures 12A, 12B, 12C:
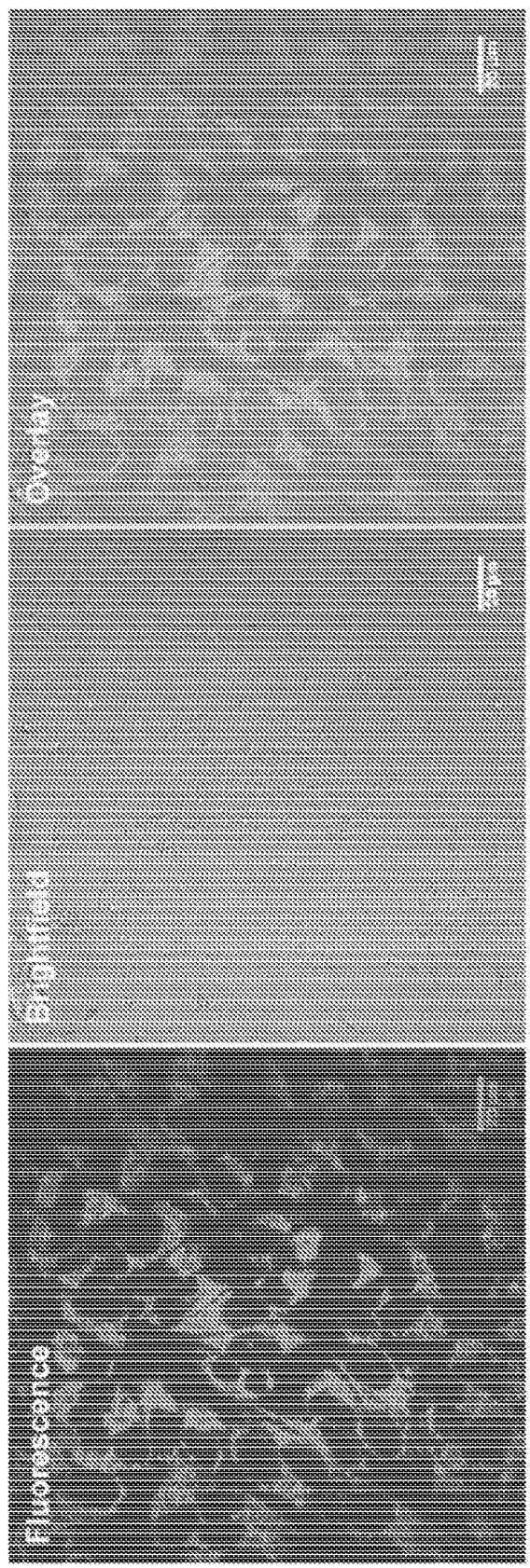
FIGS. 12A-12C are a set of confocal microscopy images showing internalization of AuNC@dye to HeLa cells after incubation at 37° C. for 4 hours.

The bioimaging application of the AuNC@dye molecular lantern was demonstrated using HeLa cells as a model cell line. The cytotoxicity was first examined by MTT assay of the HeLa cells incubated with AuNC@dye of varied concentrations. The 24 hour cell viability was as high as 98.4% even when the AuNC@dye concentration was raised to 200 μM (FIG. 11) The good biocompatibility could be attributed to the use of bio-derived materials as the precursor and the low toxicity of AuNCs. After 4 hours incubation with AuNC@dye at 37° C., HeLa cells were washed three times with PBS buffer to remove the excess AuNC@dye and imaged using a confocal laser scanning microscope (FIGS. 12A-12C). By comparing the fluorescence, bright field and the overlay images, it can be seen that the AuNC@dye has been successfully taken up by the HeLa cells and are evenly distributed in the cytoplasm (FIGS. 12A-12C). The bright green fluorescent staining of the HeLa cells suggests the potential of AuNC@dye molecular lantern as a novel bioimaging agent. FIG. 12B is the brightfield image of the HeLa cells stained with AuNC@dye. It is hard to tell the morphology of the HeLa cells due to poor contrast. FIG. 12A is the fluorescence image of the cells irradiated with UV light. The morphology of the HeLa can be easily identified due to the emission of AuNC@dye. The bright area in FIG. 12A is cytoplasm where AuNC@dye is evenly distributed, while the dark spots are nuclei where the AuNC@dye cannot enter. FIG. 12C is the overlay of the fluorescence image and brightfield image.

INDUSTRIAL APPLICABILITY

Owing to its small size, intense fluorescence, and good compatibility with biological systems, the nanocomposite may be useful in fluorescence based applications in biological systems such as biosensing and bioimaging. The unique fluorescent property of the hybrid nanocomposite may also have potential applications in several fluorescence-based applications such as, but not limited to, smart sensing, dye sensitized solar cells, light-emitting diodes (LED), imaging and in security inks.

In addition, due to the good biocompatibility and high brightness of the nanocomposite, it may be useful as a luminescent probe for biological imaging of live cells.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:
1. A method for forming a nanocomposite having a core-shell structure, the method comprising the steps of:
   forming a core comprising a first fluorophore capable of aggregation induced emission, wherein the first fluorophore is a nanocluster comprising a metal formed by contacting a metal salt with a reductant, and the metal is selected from the group consisting of gold, silver, platinum, copper and any mixture thereof, and
   depositing a second fluorophore on the surface of the core to form a shell at least partially surrounding the core, by contacting the core with an oxidant comprising a benzoquinone and a biomolecule comprising a thiol group and a primary amine group, wherein the second fluorophore is an organic fluorophore comprising a benzothiazine moiety that is capable of aggregation caused quenching,
   wherein the molar concentration ratio of metal salt:reductant is in the range of about 2:3 to about 3:2 and the molar concentration ratio of reductant:biomolecule is about 1:4 to about 1:2; and
   the first fluorophore and the second fluorophore emit fluorescence at different wavelengths.

2. The method according to claim 1, wherein the nanocluster has a diameter of less than 2 nm.

3. The method according to claim 1, wherein the biomolecule is an amino acid or a peptide.

4. The method according to claim 3, wherein the reductant is 1,4-hydroquinone.

5. The method according to claim 3, wherein the oxidant is 1,4-benzoquinone or a derivative thereof, and the peptide is a peptide comprising Cys or is Cys-Gly, or the amino acid is Cys.

6. The method according to claim 3, wherein the forming step and depositing step are performed simultaneously, and comprises contacting the metal salt, the reductant, the oxidant and the biomolecule in a single reaction vessel to form a mixture.

7. The method according to claim 6, wherein the metal salt, reductant and biomolecule are contacted at a concentration in the range of about 0.5 mM to about 15 mM.

8. The method according to claim 6, further comprising a step of adding a base to adjust the pH of the mixture to be in the range of about 11 to about 12.

9. The method according to claim 1, wherein the forming step and/or the depositing step is performed in aqueous solution.

10. The method according to claim 1, wherein the forming step and depositing step are performed simultaneously or sequentially.

11. The method according to claim 1, wherein the forming step and/or the depositing step are performed for a duration in the range of about 18 hours to about 30 hours.

12. The method according to claim 1, further comprising the step of purifying the nanocomposite by dialysis.

13. The method according to claim 12, wherein the dialysis is performed at a molecular weight cut-off (MWCO) in the range of about 4 kDa to about 8 kDa.

14. A nanocomposite obtained by the method of claim 1.

15. A method for altering the fluorescence of a nanocomposite having a core-shell structure, the method comprising the step of
changing an aggregation state of the core-shell nanocomposite, wherein the core of the nanocomposite comprises a first fluorophore capable of aggregation induced emission, wherein the first fluorophore is formed by contacting a metal salt with a reductant, and the metal is selected from the group consisting of gold, silver, platinum, copper and any mixture thereof, and the shell of the nanocomposite comprises a second fluorophore deposited on the surface of the core by contacting the core with an oxidant comprising a benzoquinone and a biomolecule comprising a thiol group and a primary amine group so that the shell at least partially surrounding the core, wherein the second flurophore is an organic fluorophore comprising a benzothiazine moiety that is capable of aggregation caused quenching,
wherein the molar concentration ratio of metal salt:reductant is in the range of about 2:3 to about 3:2 and the molar concentration ratio of reductant:biomolecule is about 1:4 to about 1:2; and
the first fluorophore and the second fluorophore emit fluorescence at different wavelengths.

* * * * *